Aug. 21, 1934.  W. DIETER  1,971,065
CAN TESTING MACHINE
Filed Sept. 10, 1932   9 Sheets-Sheet 1
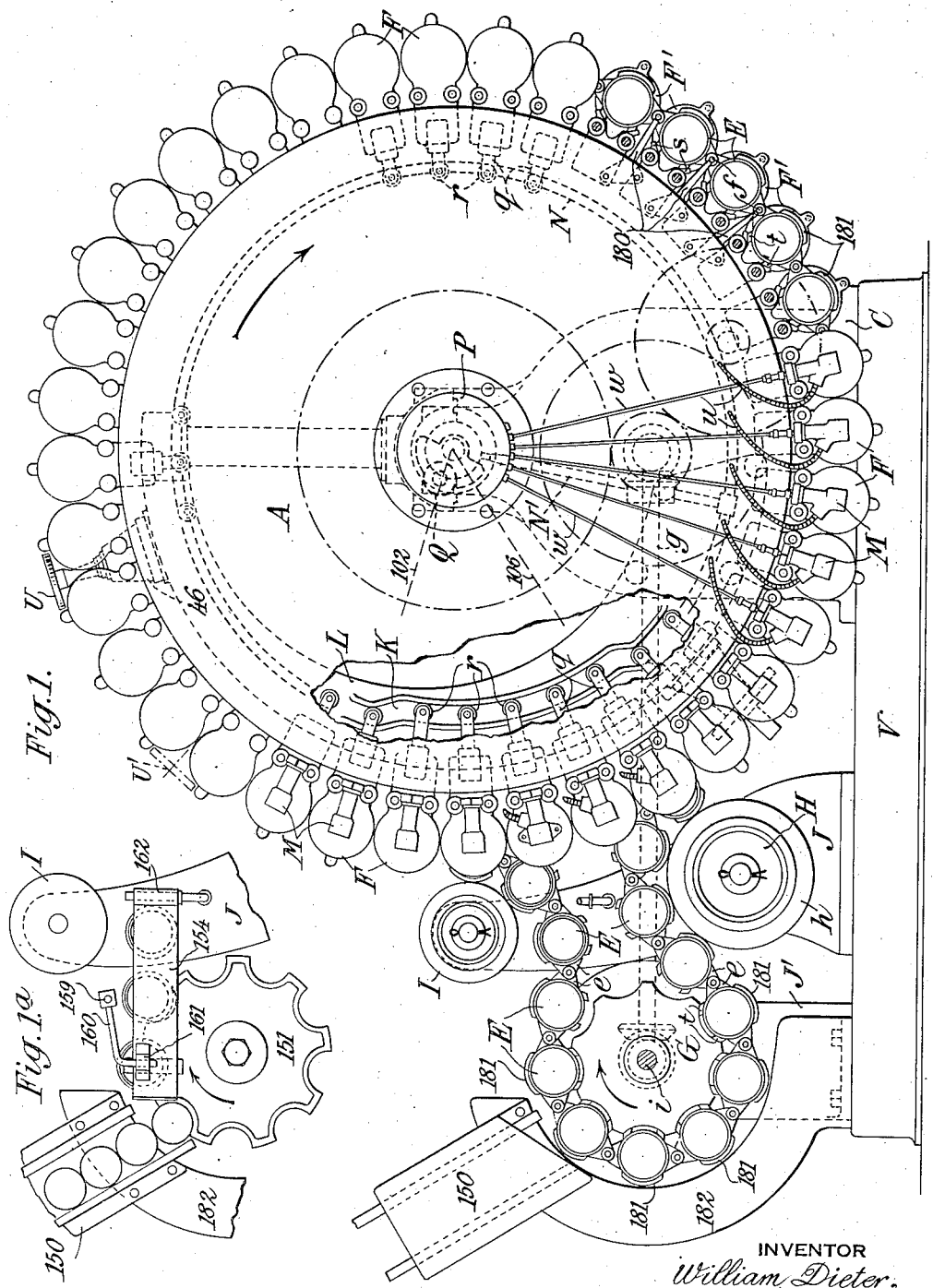
INVENTOR
William Dieter,
BY
Fraser, Myers + Manley
ATTORNEYS.

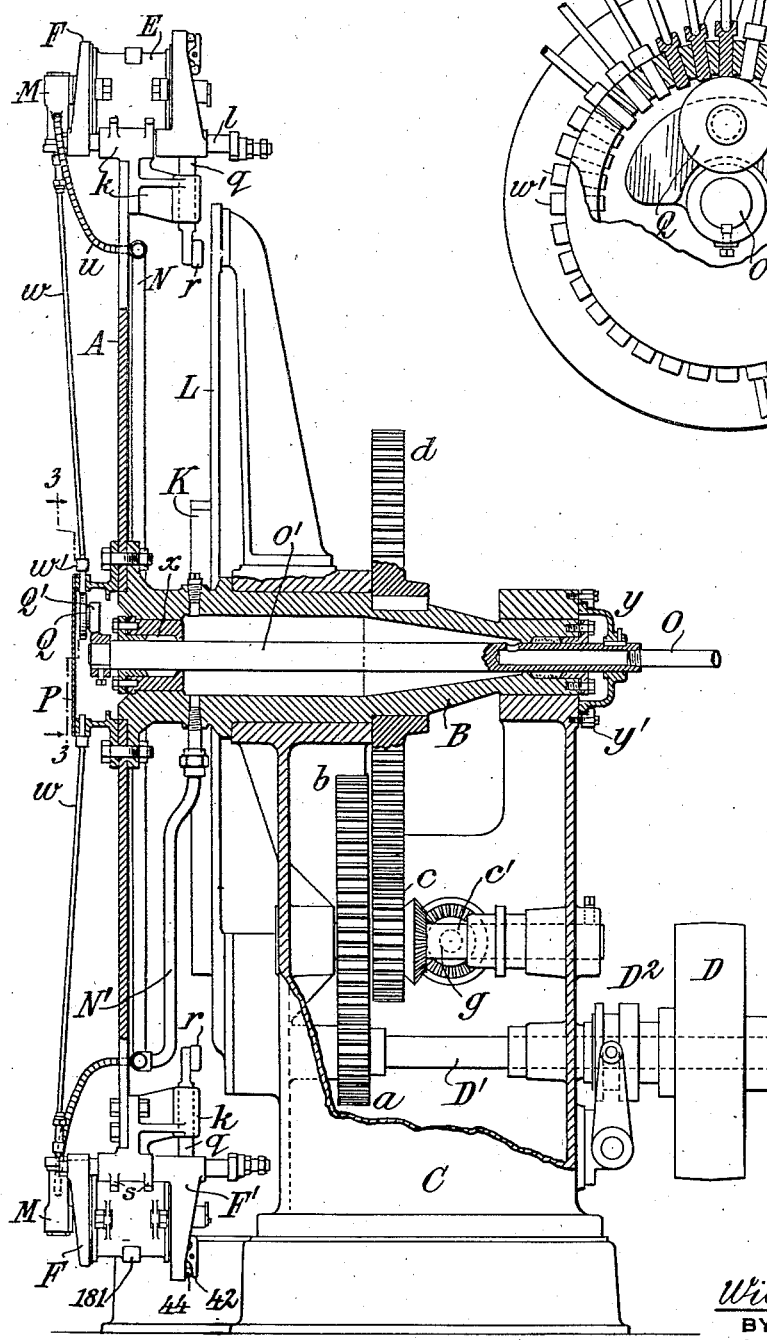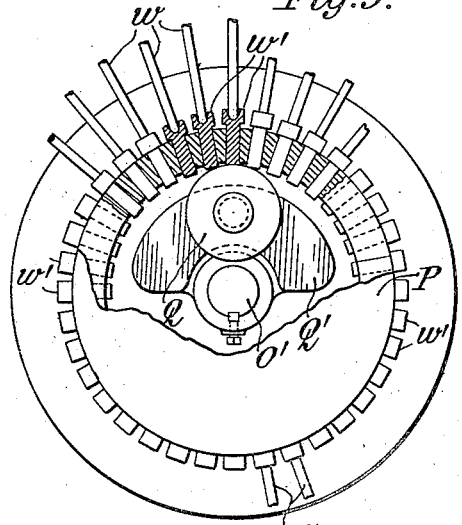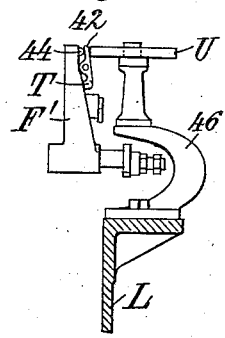

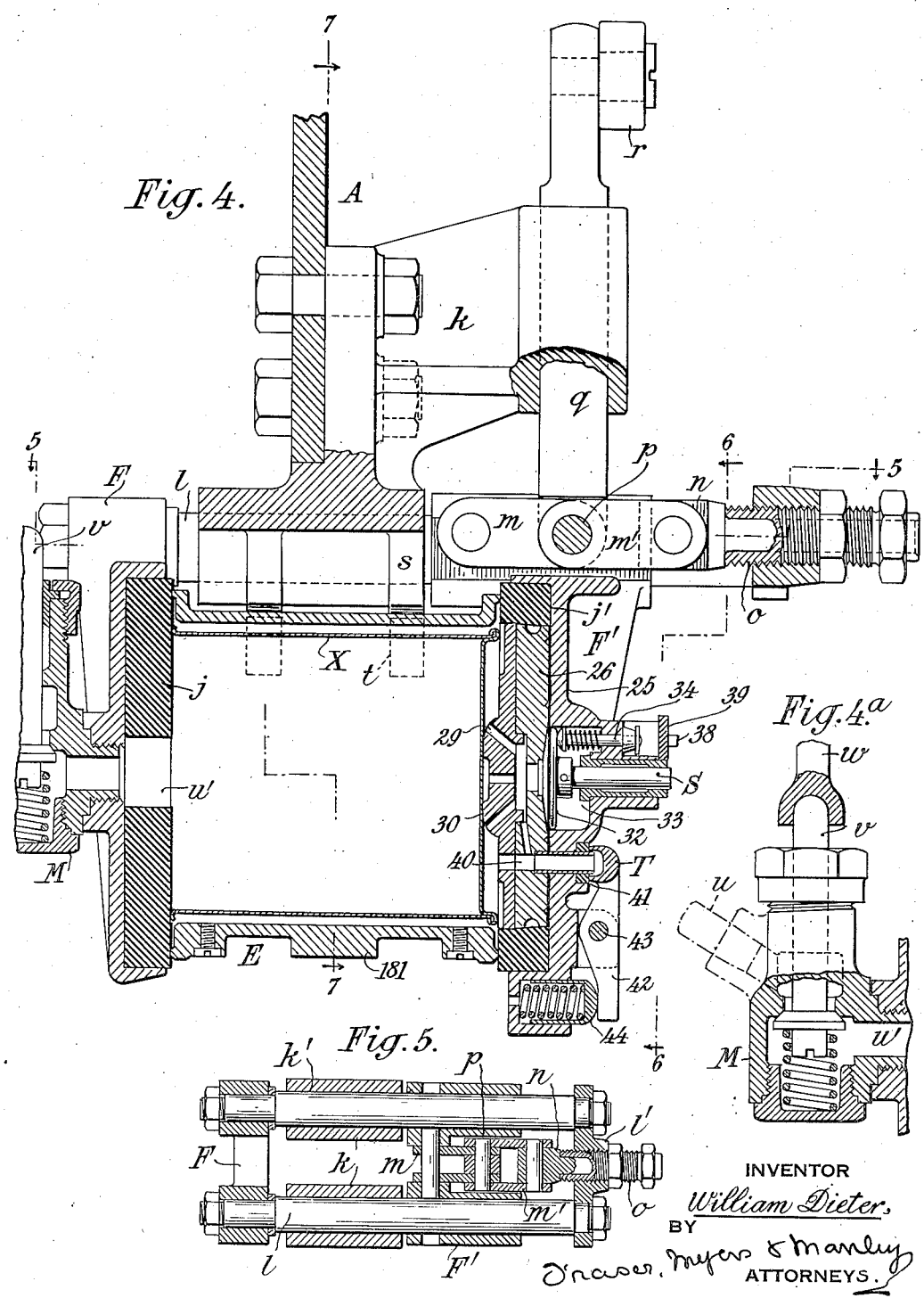

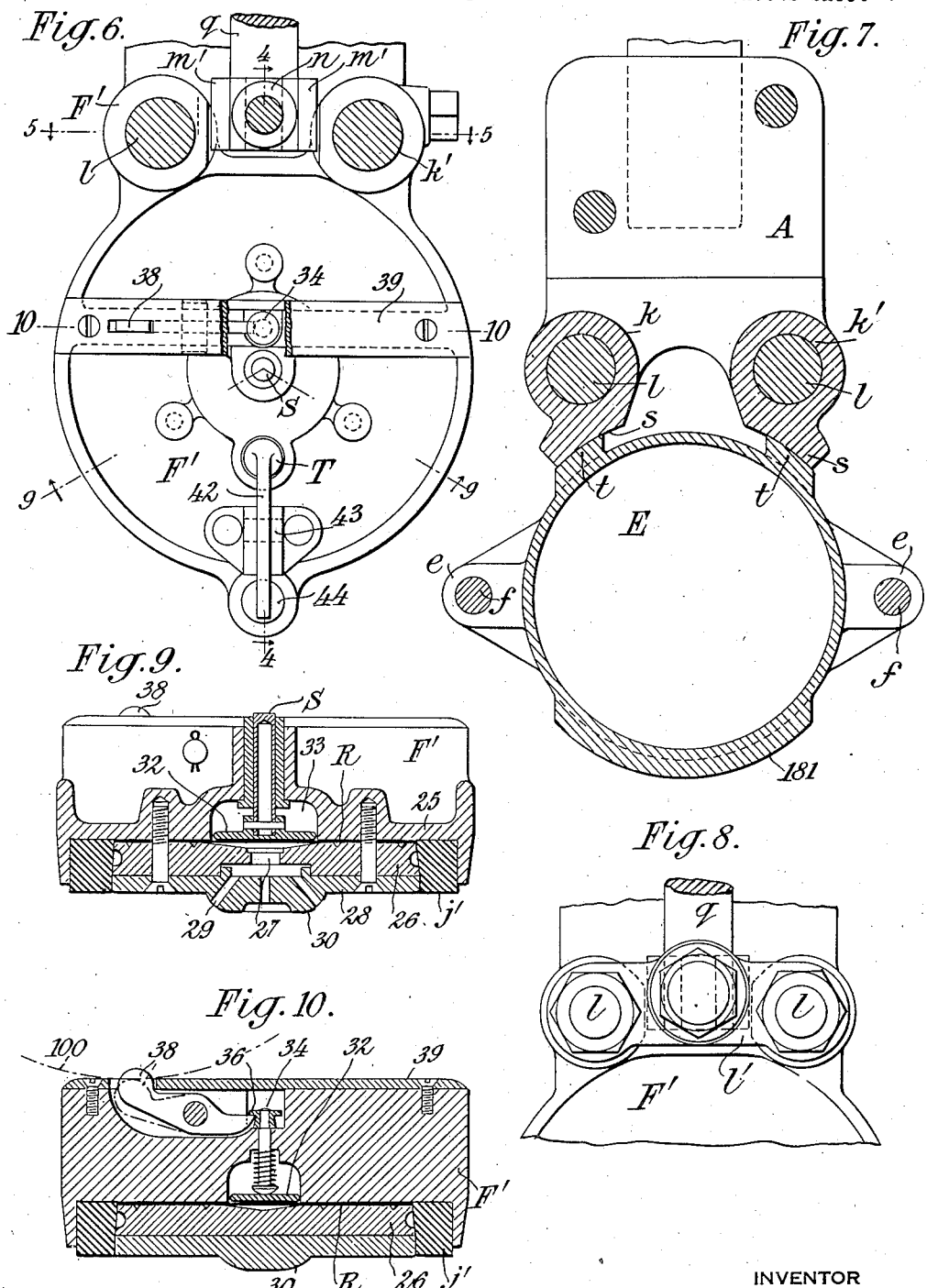

Aug. 21, 1934.  W. DIETER  1,971,065
CAN TESTING MACHINE
Filed Sept. 10, 1932  9 Sheets-Sheet 5
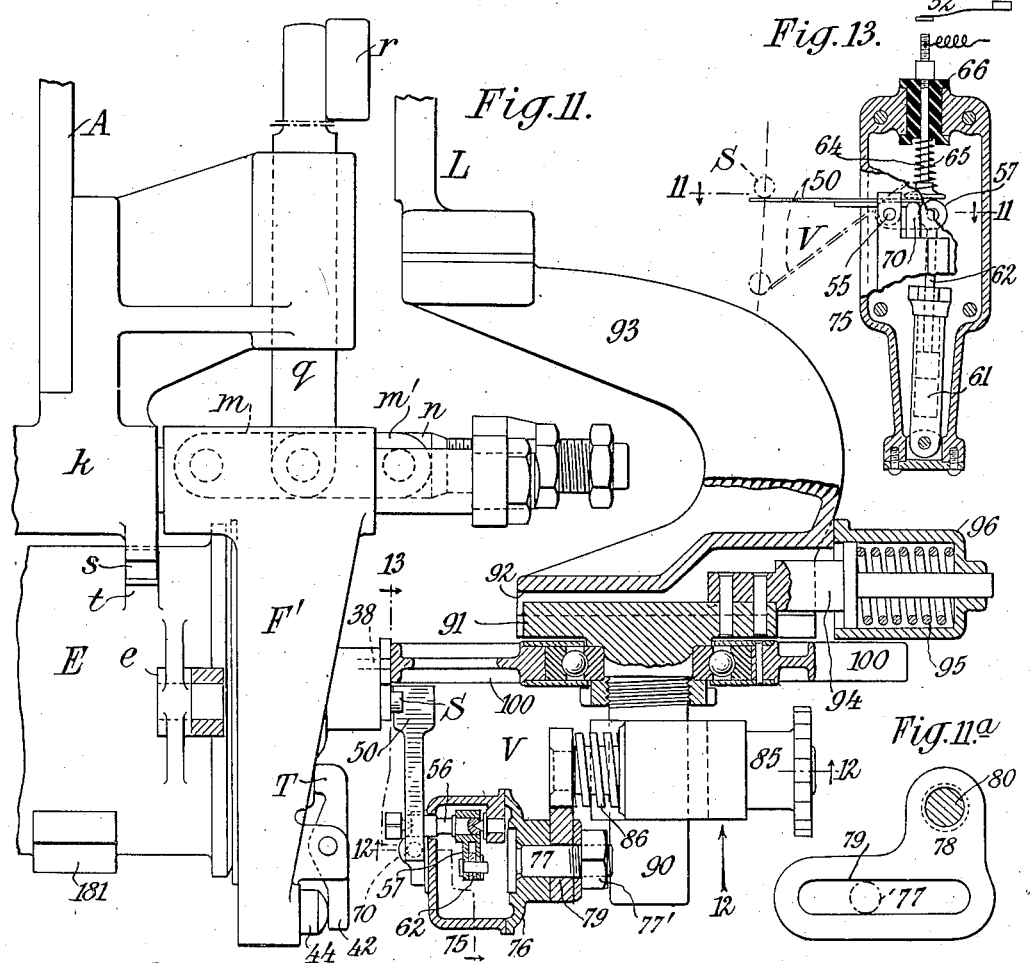
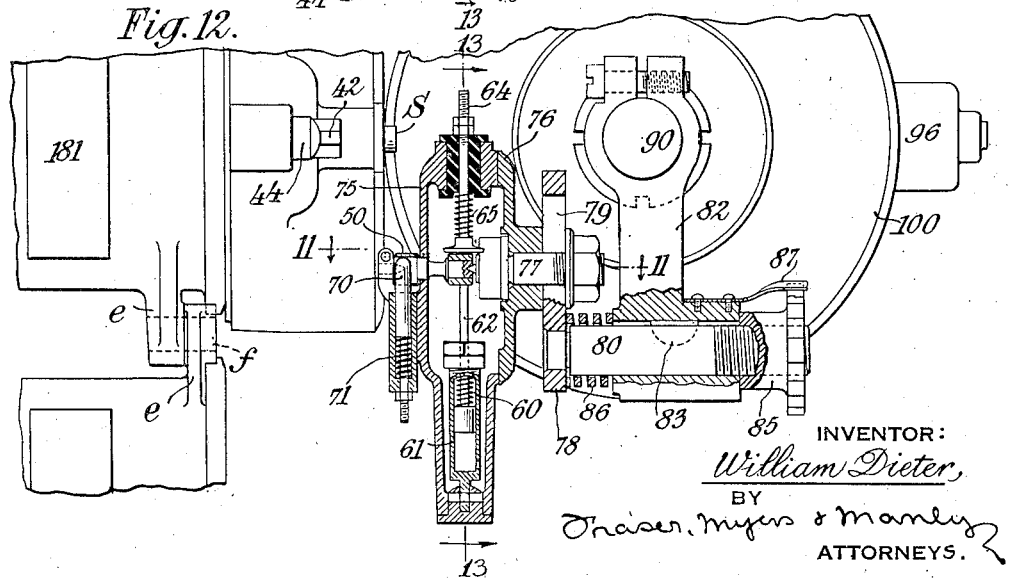
INVENTOR:
William Dieter,
BY
Fraser, Myers & Manley
ATTORNEYS.

Aug. 21, 1934.   W. DIETER   1,971,065
CAN TESTING MACHINE
Filed Sept. 10, 1932   9 Sheets-Sheet 6
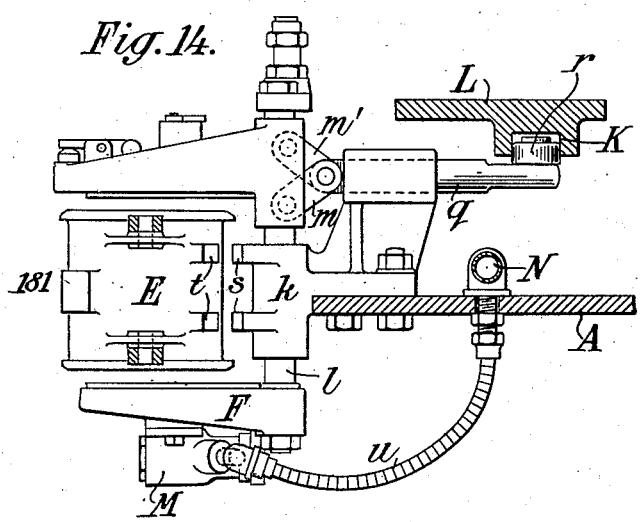
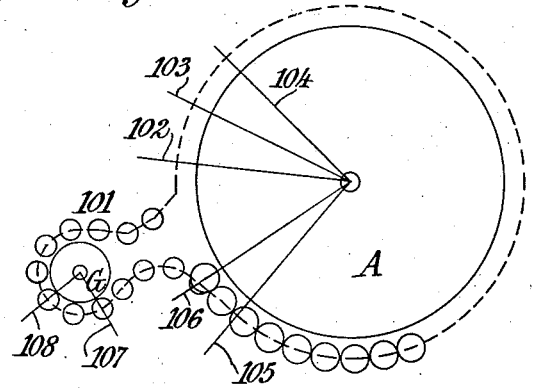
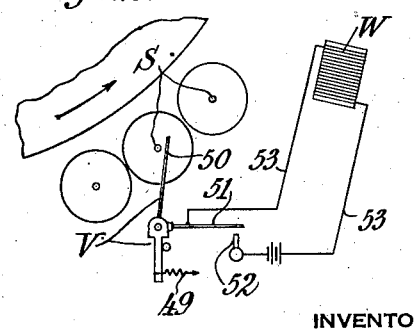
INVENTOR
William Dieter
BY
Fraser, Myers & Manley
ATTORNEYS.

Aug. 21, 1934.  W. DIETER  1,971,065
CAN TESTING MACHINE
Filed Sept. 10, 1932.  9 Sheets-Sheet 7
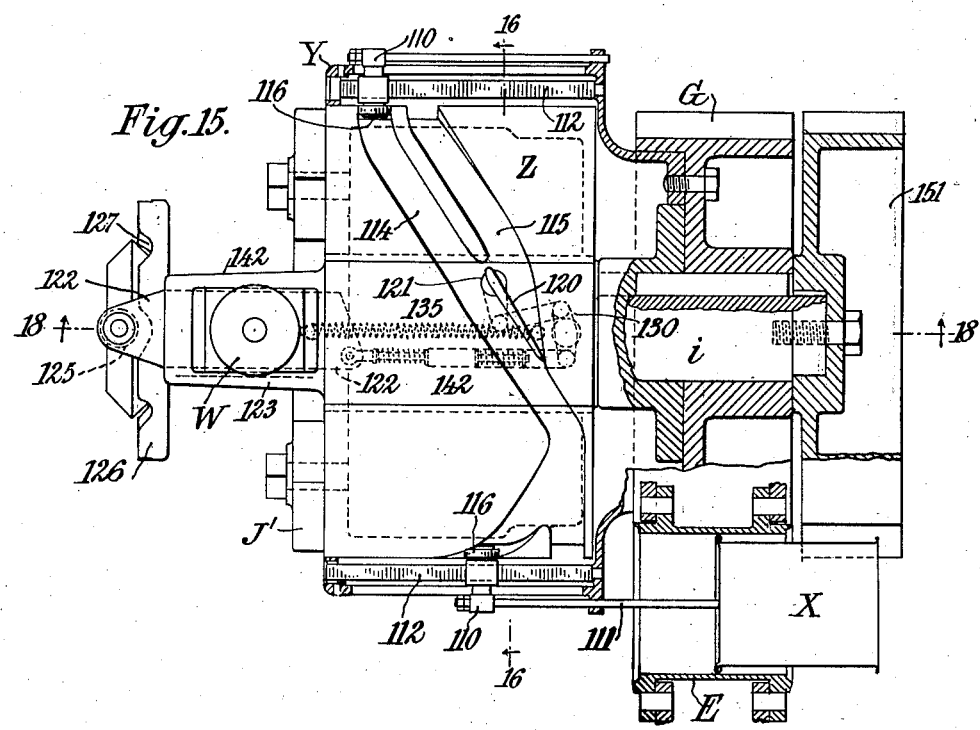
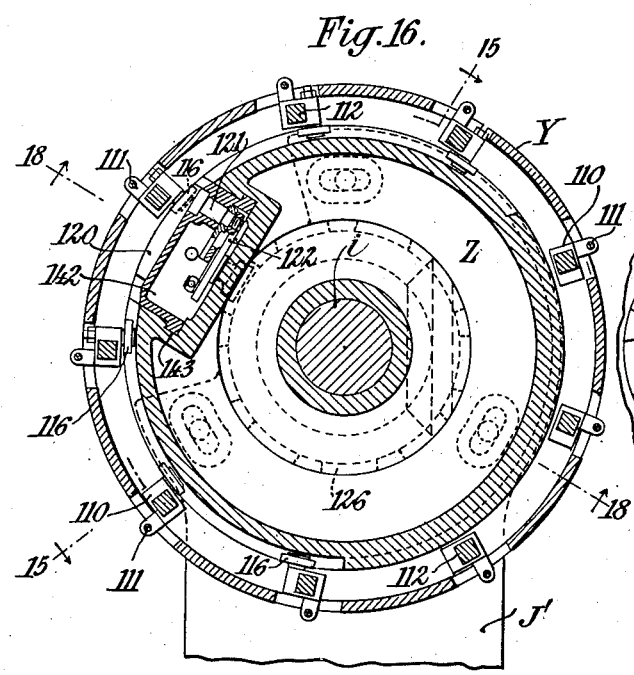
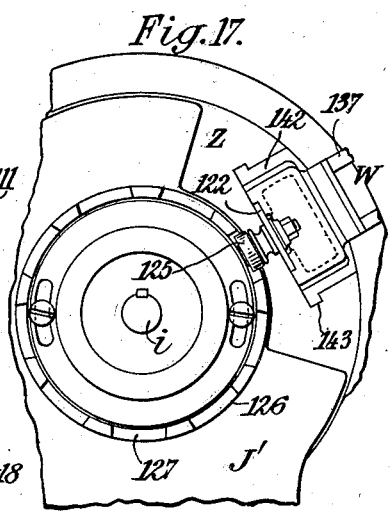
INVENTOR
William Dieter
BY
Fraser, Myers + Manley
ATTORNEYS.

Aug. 21, 1934.  W. DIETER  1,971,065
CAN TESTING MACHINE
Filed Sept. 10, 1932  9 Sheets-Sheet 8
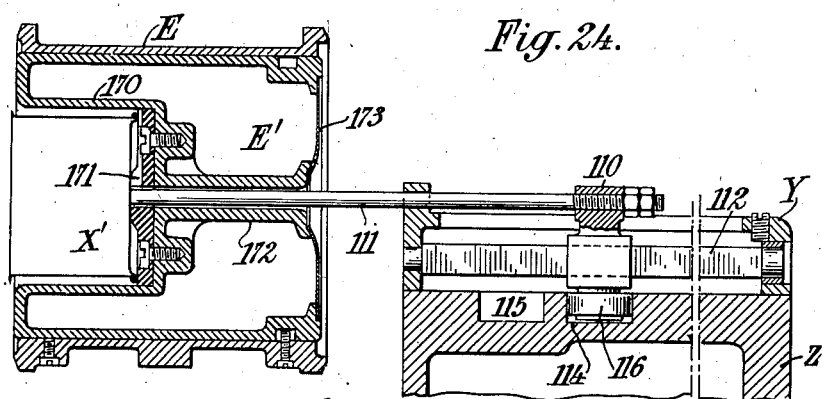
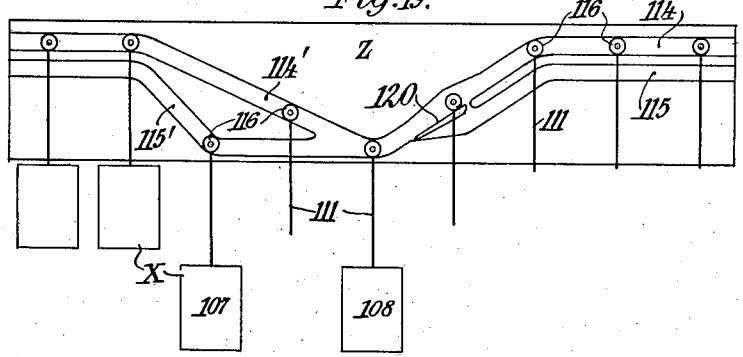
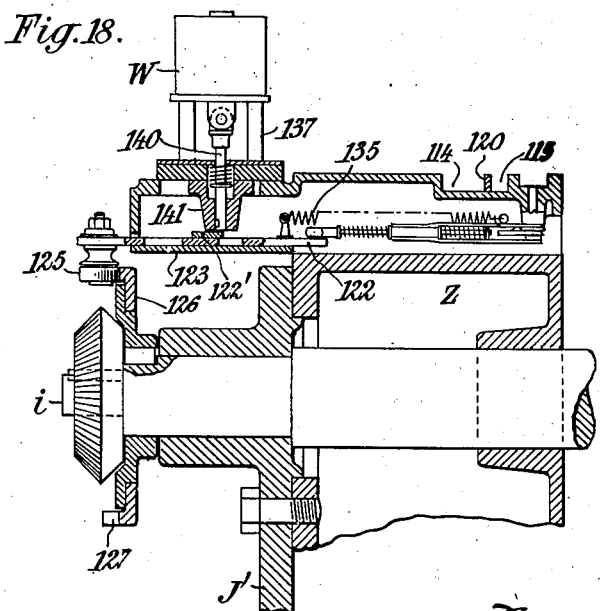
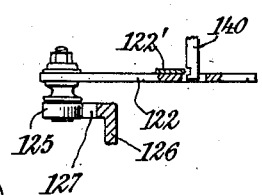
INVENTOR
William Dieter,
BY
Fraser, Myers & Manley
ATTORNEYS Aug. 21, 1934.    W. DIETER    1,971,065
CAN TESTING MACHINE
Filed Sept. 10, 1932    9 Sheets-Sheet 9
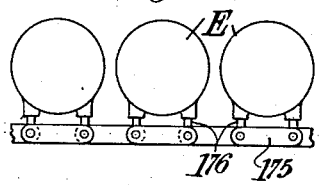
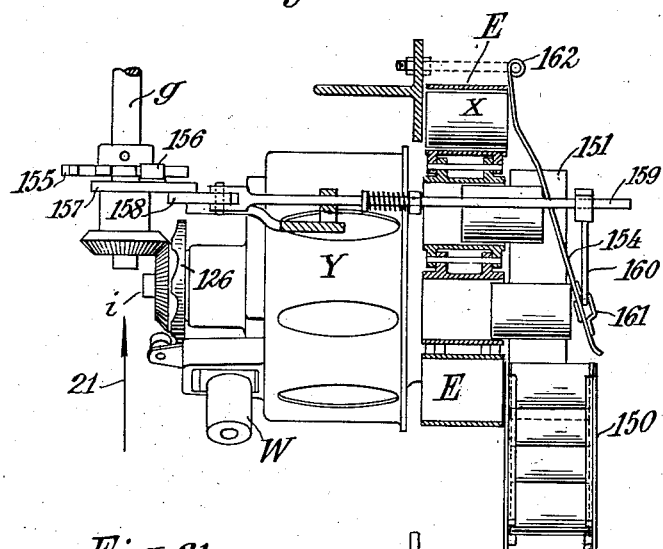
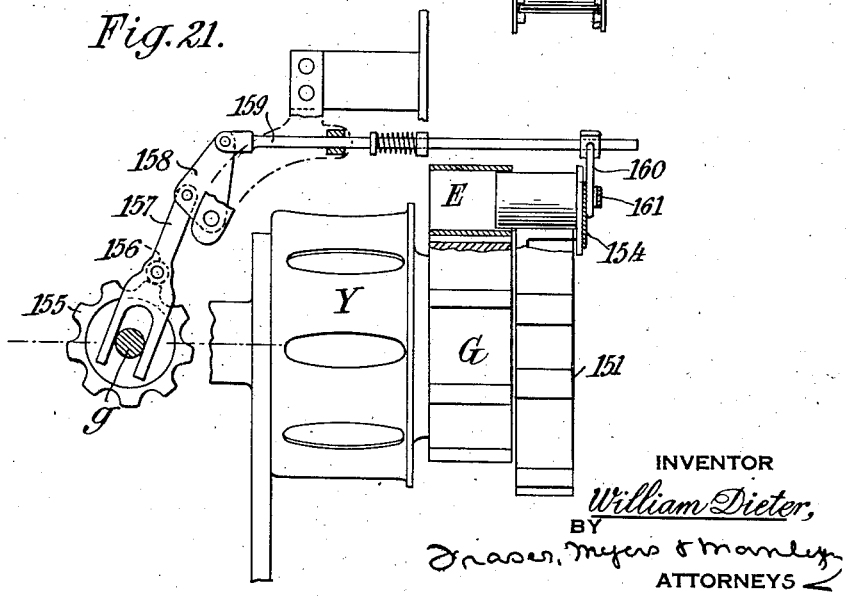
INVENTOR
William Dieter,
BY
Fraser, Myers & Manley
ATTORNEYS Patented Aug. 21, 1934

1,971,065

UNITED STATES PATENT OFFICE 1,971,065

CAN TESTING MACHINE

William Dieter, Newark, N. J.

Application September 10, 1932, Serial No. 632,567

26 Claims. (Cl. 73—51)

This invention relates to a machine for testing cans or other containers in order to determine whether they are leaktight. Such machines as heretofore constructed have commonly comprised a series of testing units mounted on a rotating or traveling carrier such as a large wheel or an endless chain, the cans to be tested being fed to the successive heads at one point in their travel, air (or other fluid medium) under pressure (or vacuum) being admitted to the respective units in such manner as to put the cans under test, each unit having a diaphragm or other device responsive to a change in pressure; and at a suitable point, corresponding to the travel of the cans under test for a sufficient time, is located a detector device which responds to the pressure indication and in turn operates an ejector whereby the leaky cans are discharged in one position and the perfect cans in another position or by a different outlet. It is usual to construct such testing units with a shell or chamber within which the can to be tested is enclosed, and a head for closing the open end of such shell hermetically during the testing period.

The present invention relates to can testing machines of this general description, and has for its object to produce an automatic machine of high speed which shall afford very sensitive testing means.

According to the present invention the carrier, which is preferably a large wheel, has attached to it only the heads for closing the testing shells, the open-ended shells being otherwise mounted, and being fed into position successively on the wheel between the respective heads, which then are closed together to make a hermetic joint with the opposite ends of the respective shells, after which pressure is admitted for testing as heretofore. Means are provided for introducing the cans to be tested within the open-ended shells and for feeding the latter into place on the wheel. After each can under test has travelled around for nearly the full circumference of the wheel, whereby is afforded a prolonged period for testing, a detector acts to record the result of the test, and immediately thereafter the heads separate to liberate the shell, which is thereupon conducted away from the carrier wheel, and ejecting means act thereon under control of the detector to expel the cans from the successive shells, the leaky and sound cans being ejected at different outlets.

In the preferred construction the successive shells are carried by an endless chain, and this chain is carried around an auxiliary wheel or sprocket to bring the carriers to the ejecting and can-feeding mechanisms. Various novel features of the machine will be described hereinafter.

The preferred construction of machine embodying this invention is shown in the accompanying drawings, wherein—

Figure 1 is a side elevation of the machine partly broken away, certain mere duplications of parts being omitted for clearness;

Fig. 1a is a fragmentary view corresponding to a portion of Fig. 1;

Fig. 2 is a side view partly in vertical mid-section in the plane of the axis of rotation;

Fig. 2a is a fragmentary elevation showing parts appurtenant to the structure shown in Fig. 2;

Fig. 3 is an enlargement of the central or hub portion of the carrier wheel in Fig. 1 partly broken away to show the interior construction, in section on line 3—3 in Fig. 2;

Fig. 4 is a section in a radial plane intersecting the axis of rotation and intersecting the center of an individual testing head, the plane of the section being indicated by the line 4—4 in Fig. 6;

Fig. 4a is a fragmentary view showing the construction at the left of Fig. 4;

Fig. 5 is a section on a reduced scale in the plane of the line 5—5 in Figs. 4 and 6;

Fig. 6 is an elevation of one of the heads on a testing unit partly in section on the line 6—6 in Fig. 4;

Fig 7 is a section through the testing unit on the line 7—7 in Fig. 4;

Fig. 8 is a fragmentary elevation viewed from the right in Fig. 4;

Fig. 9 is a section through one of the heads of the unit in the plane of the line 9—9 in Fig. 6;

Fig. 10 is a similar view in the plane of the line 10—10 in Fig. 6;

Fig. 11 is a sectional elevation showing a part of one testing unit and showing, partly in section, the detector construction, the section being in a plane radially of the axis of rotation of the wheel and as indicated by the line 11—11 in Fig. 13;

Fig. 11a is a detail of the detector mounting;

Fig. 12 is a view showing the same parts viewed in the direction of the arrow 12 in Fig. 11, the sectional portion being taken in the plane of the line 12—12 in Fig. 11;

Fig. 13 is a section of the detector shell in the plane of the line 13—13 in Figs. 11 and 12;

Fig. 14 is an elevation of one unit with its heads separated, partly in section in a plane radial to the axis of rotation;

Fig. 15 is a sectional elevation of the ejector control mechanism, its sectional portion being cut on a diametrical plane coincident with the axis of the sprocket and indicated by the line 15—15 in Fig. 16;

Fig. 16 is a transverse section of the same mechanism in the planes indicated generally by the lines 16—16 in Fig. 15;

Fig. 17 is a fragmentary elevation viewed from the left in Fig. 15;

Fig. 18 is a fragmentary longitudinal section cut in the plane of the lines 18—18 in Figs. 15 and 16;

Fig. 18a is a fragment of Fig. 18 showing the parts in a different position;

Fig. 19 is a diagram illustrating the belated ejection under the control of the mechanism shown in Figs. 15 to 17;

Fig. 20 is a sectional elevation illustrating mainly the mechanism for feeding in cans to be tested;

Fig. 21 is a sectional elevation of the same mechanism looking in the direction of the arrow 21 in Fig. 20;

Figs. 22 and 23 are diagrams;

Fig. 24 is a fragmentary sectional view showing a modification, the plane of the section being diametrical of the shell and including a portion of the ejecting mechanism;

Fig. 25 is a fragmentary view showing a modification.

In the machine here shown the carrier A is a large wheel conveniently mounted in a vertical plane upon a tubular shaft B which turns in bearings on frame C, as best shown in Fig. 2,— any suitable gearing, such as the train a b c d, being provided for rotating it from a source of power such as a pulley D on a drive-shaft D' which is given a driving connection with this shaft by a clutch D² in a usual manner.

For receiving the cans to be tested, open-ended shells E, E are provided which are carried around on the wheel A, being located thereon between end heads F, F' which are mounted permanently on the wheel and are movable to close them against the opposite open ends of the shells E, E to form hermetically enclosed chambers within the shells, or to separate them from the shells to permit the latter to be fed away from the circular path they travel while carried by the wheel A. For properly conveying the shells, they are best carried on an endless chain which is most conveniently formed by utilizing the shells themselves as links, the shells being formed with lugs or ears e, e forming hinge eyes and pivoted together by hinge pins or pintles f, f (see Figs. 7 and 12).

For carrying the chain of shells during their travel away from their orbit on the wheel A, an auxiliary wheel or sprocket G is provided, as shown in Figs. 1 and 1a. While this sprocket might be turned by the chain itself, it is preferably independently rotated by miter gears connecting it to a shaft g which is driven by miter gears from a shaft c' (Fig. 2) on which the gear c is fixed. The means for feeding cans into the receptacles constituted by the shells E, E and the means for ejecting the tested can are applied in association with the sprocket G, so that the shells in passing around this sprocket have the defective and the perfect cans ejected from them in two different positions, after which the empty shells are successively charged with new cans to be tested.

For directing the chain of shells from the wheel A to the sprocket G, it is desirable to provide a guide wheel H, which preferably has a pneumatic or other yielding tire h; and for guiding the shells back into position between the heads F, F' on the wheel A, it is desirable also to provide a similar guide wheel I, which may also desirably have a yielding tire. The wheels H, I are mounted to turn as idlers on studs fixed on the frame J, and the sprocket G turns on a shaft i carried in a bearing frame J'.

Each shell E when clamped between its heads F, F' constitutes a testing unit carried by the wheel A. For making air-tight joints between the respective heads and the ends of the shells, each head F is formed with a yielding gasket j, and each head F' is formed with an annular yielding gasket j', as shown in Fig. 4. The can X to be tested is enclosed with the least practicable clearance within the chamber E, its open end being pressed into hermetic union with the packing gasket j, while its closed end buttoms against the head F'—all as clearly shown in Fig. 4.

The heads F, F' are slidably mounted on the wheel A, the preferred construction being as shown best in Figs. 2, 4, and 6 to 11, where the wheel for each testing unit has fastened to it a removable bracket k which is formed with two parallel holes or bores k' for receiving two rods l, l, which are fixedly attached to the head F and slide freely through coinciding bores in the head F', as shown in Fig. 5, their ends being united by a yoke l'. For moving the heads equally out and in, a toggle device is applied, of the construction best shown in Figs. 4, 5 and 11, consisting of toggle links m, m' jointed together and connected by pin joints at their outer ends, one to the head F' and the other to a head n seated in an adjusting screw o threaded in the yoke l'. The middle joint of the toggle is pivoted by hinge pin p (Fig. 4) to a slide q working through a slidway in the bracket k and carrying on its inner end a roller r, the several rollers being acted upon by a stationary cam-way K carried by an annular frame L fixedly mounted on the main frame C (Figs. 1 and 2). As the wheel revolves the rollers r running in the cam-way are moved out or in, whereby on their outward movement they straighten the toggles m, m' and force the heads F, F' together against the ends of the shell E; on their inward movement they buckle the toggle, thereby separating the heads F, F' to free the intervening shell E. They are shown thus separated in Fig. 14.

For accurately seating the shells E, E against the wheel, the brackets k are formed with bearing ears s, s, and the shell with bearing lugs t, t, which come into reciprocal seating contact,—as shown in Fig. 7.

Air under pressure (or vacuum) is admitted to the interior of each can under test through one of the heads F, F'—preferably through the head F. For this purpose the head F is provided with an inlet valve M, best shown in Fig. 4a, to which air is admitted through a branch pipe or hose u, the several branches u leading from an annular supply pipe N carried by the wheel A and to which air is admitted from a central supply pipe O (Fig. 2) which passes it through the bore of a central stationary pipe O', which passes through the hollow shaft B and has a perforation admitting the air into the hollow of this shaft and from which it passes by a radial pipe N' to the pipe N. From each valve M an inlet u' opens into the interior of the can X under test, as shown in Fig. 4. The valves M are spring-closed tappet valves of wellknown construction, the tappet plunger $v$ passing out from the valve shell through a stuffing box as usual. The valve stems $v$, $v$ of the several valves, which are all arranged radially, are engaged by the outer ends of valve rods $w$, the inner ends of which connect with radial plungers $w'$ having free sliding movement in radial bores in a shell P which is fastened over the hub portion of the wheel A and has within it a cam chamber preferably separated by a stuffing box $x$ from the air pressure chamber within the hollow shaft B. The inner ends of these plungers project sufficiently through the shell so that they are acted upon by an internal cam Q, best shown in Fig. 3, which is conveniently formed as a roller carried by a segment or essentially a crank Q' which is fastened upon the end of the stationary tubular air-inlet shaft O', which shaft is held stationary by being keyed within an end cap $y$ (Fig. 2), which cap is clamped by screws $y'$ to the hub portion of bearing C so that it may be set to different angular positions in order to vary the active position of the cam Q. As each plunger $w'$ in the rotation of the wheel rides up on the cam wheel Q, it is thereby pushed outwardly so that its rod $w$ presses back the valve stem $v$ and opens the valve to admit air within the can to be tested. The precise point in the revolution of the wheel at which this occurs is determined by the setting of the cam by means of the shaft O' and its cap $y$ at one or another angular position.

Each of the heads F'' is provided with a pressure-responsive device to be acted upon by any air which may leak from the interior of the can under test. While other equivalent devices for this purpose are known, it is preferable that the pressure-responsive device be a diaphragm R— best shown in Figs. 4, 9 and 10—which is marginally clamped between the wall 25 of the head and a disk 26, the latter having a central opening 27 for admitting pressure from the chamber around the can to the diaphragm and being centrally reduced to give the admitted air free access to the middle portion of the diaphragm. Plate 26 may be supplemented by a plate 28, as shown in Fig. 9, having communicating air openings 29 through it and having a central boss 30 for supporting the middle portion of the can end to prevent its bulging unduly under the internal pressure. On the opposite side of the diaphragm is a plunger S having an enlarged head 32 which lies against the diaphragm and is movable within a chamber 33. Within this chamber it receives the pressure of a spring-pressed plunger 34 (Figs. 4 and 10), the stress of which is opposed to the testing pressure within the can. This plunger has a flanged head 36 under which engages one end of a lever 38 (Figs. 6 and 10), the end of the opposite arm of the lever projecting out through a slot in the outer side of the head F'' (preferably formed in a plate 39), where in the circular travel of the wheel it is brought at the detecting station, to be later described, against a cam 100 which will retract the plunger 34 and leave the diaphragm free to flex under the pressure induced by leakage from a defective can.

Each head F'' is also provided with a relief valve T (Fig. 4) closing a vent opening 40, being shown as a cup, the edges of which seat against a gasket 41. The cup valve is shown as formed on a lever 42 fulcrumed at 43, its opposite arm being pressed out by a spring plunger 44. In the travel of the wheel A the tail of the lever 42 rides over a stationary cam U, which is shown as a disk or wheel supported in a stationary position in any suitable way, as by being mounted on a bearing bracket 46 which is made fast to the stationary frame L, in the manner shown in Fig. 2a. The purpose of this relief valve is to primarily equalize the pressure in the chamber surrounding the can under test, which is done just preceding the test period. For this purpose the cam U may be set in the position shown in full lines in Fig. 1, or at an earlier point in the travel as shown, for example, in dotted lines at U'.

The detector is located to be acted upon from each can testing chamber at the end of the test period, and preferably shortly before the heads are separated and the shells fed away from the wheel A. The detector is essentially a part located to be displaced by plungers S whenever any plunger is protruded in consequence of leakage through the can into the testing chamber around it. Such displacement of the detector operates mechanism which will insure the ejection of the defective can when it reaches the ejecting position. A sound can, having permitted no leakage to displace the diaphragm and extrude its plunger S, has no effect upon the detector. The detector may operate mechanically or electrically, an electric form being chosen in the illustrated embodiment.

The nature of the operation will first be described with reference to the diagram, Fig. 22, where V is the detector, being essentially a tappet arm 50 located in the path of travel of any plunger S which may be projected and which, when struck by the plunger in passing, is turned downwardly around its pivot against the stress of a spring 49, thereby swinging a contact arm 51 over into contact with a contact stop 52,— these parts being, respectively, the terminals of an electric circuit 53, which includes a solenoid W, which in turn operates the ejector control means to be later described. As the plunger passes beyond the detector arm, the latter snaps back to its original position and the circuit is broken.

The developed form of this circuit-closing detector is shown in Figs. 11, 12 and 13. Here the tappet arm 50 (Fig. 13) is preferably a spring arm turning about a pivot 55, being mounted on a head on the end of a rock shaft 56 (Fig. 11), which has an arm 57 which is stressed by a spring 60, shown as enclosed in a dash-pot 61 and exerting a downward pull on the arm through a stem or link 62 (Fig. 13). The correct location of the arm 50 with respect to the protruded plunger S is shown in Fig. 11. The plunger is shown in dotted lines at S in Fig. 13 in the position when it first encounters the tappet arm 50. If protruded, it presses this arm down to approximately the position shown in dotted lines in Fig. 13, which causes the crank arm 57 to swing upwardly and thereby presses up the expanded head of a contact pin 64 against the stress of a spring 65, which pin slides in an insulating bushing 66. The pin 64 performs the function of the contact arm 51 in the diagram for closing against the contact 52 to complete the circuit and energize the solenoid W. The tappet arm receives the upward pressure of a plunger 70 stressed by a spring 71 of greater strength than the spring 60, so that the plunger affords a yielding stop for holding the tappet arm in its normal position,—which, in the event that the machine might be turned backward, will yield to the upward motion of any protruded plunger S, thus avoiding damage.

This mechanism has certain refinements of construction for mounting and adjustment. The detector parts described are enclosed in a casing 75 mounted on a plate 76 fixed on a stud 77 by which it is clamped to a bracket arm 78 by a nut 77'. The arm 78 is fixedly mounted on a stud 80 and has a slot 79 within which the stud 77 is adjustable to vary the precise time of detection by setting it to an earlier or later position in the travel of the plunger. This stud 80 is mounted non-rotatively in an arm 82 which is clamped fast on a stud 90, a key 83 being introduced to prevent rotation of the stud 80 and arm 78. For adjusting with nicety the approach of the tappet arm 50 to the heads F', F', the stud 80 is screw-threaded and receives a nut 85 by which it can be set out or in against the stress of a stiff spring 86. The nut 85 has peripheral notches entered by a retaining spring 87.

This whole mechanism is mounted on a slide 91 movable in a slideway 92 formed in a bracket arm 93 which is fastened to any convenient portion of the fixed frame of the machine,—preferably to an extension of the annular frame L on which is mounted the bracket 46, shown in Fig. 2a. The slide 91 is fastened to the plunger 94 of a stiff retracting spring 95 held in a fixed casing 96 against which it reacts; the spring thus presses the slide 91 to the left, in Fig. 11. On the stud 90 is centered a wheel 100 which has an important function in locating the entire detector mechanism with relation to the successive heads F', F'. This wheel rotates against the plates 39 of the heads, which plates are shown in Figs. 6 and 10. These plates on the successive heads constitute an intermittent track against which the wheel 100 bears, pressing against them with the stress due to the spring 95. There being an inevitable slight variance in the heads, these rails 39 are not in precisely the same plane, with the result that the wheel 100, in rolling from one to the next, may have a slight movement to right or left in Figs. 11 and 12, in which it carries with it the slide 91 and the entire detector device V. This enables a very minute and accurate adjustment to be made of the position of the tappet arm 50 with respect to the plunger S, the correct adjustment being shown in Fig. 11. Thus the entire detector mechanism moves slightly out or in as the successive heads F' present themselves for testing.

The wheel 100 performs another important function,—namely, that of a cam for operating the levers 38 by which the spring-pressed plungers 34 are retracted to permit the leak pressure against the diaphragm to expel the plunger S, as already described with reference to Figs. 6, 9 and 10. This operation must occur immediately before the encounter of the plunger with the detector in order that the plunger may be set free and its protrusion by the diaphragm permitted. For this purpose the direction of motion is such that the projecting end of the lever 38 encounters the stationary wheel 100 just in advance of the plunger S striking the detector arm 50. It thus results that the diaphragm, which is striving to bulge outwardly under the leak pressure, is released from the counter stress of the spring-pressed plunger 34, so that the plunger S (in case a leak has occurred) is protruded to the position shown in Fig. 12; and a moment later, while the wheel 100 continues to hold the lever 38 pressed back, the protruded plunger S strikes the detector arm 50 and swings it downward to the position shown in dotted lines in Fig. 13, thereby operating the circuit-closer as already described.

The mechanism whereby the detector closes an electric circuit to energize the solenoid W (or performs any other equivalent control operation) being now understood, it remains to describe the result of this solenoid (or other equivalent) operation.

The diagram, Fig. 23, shows the sequence of operations, the dotted line indicating the path of travel of the centers of the shells E, E. In this diagram the can to be tested is fed into the shell at 101, the closure of the heads against the opposite ends of the shell is completed at point 102, the admission of air pressure within the can is accomplished at point 103, the equilization of pressure exterior to the can by opening the relief valve T takes place at point 104, and the detector is located at point 105, the operation of retracting the contra-pressure plunger 34 which just precedes and continues coincidently with the detector operation occurring at substantially the same point. Between 103 and 105, the time occupied in the travel of the testing unit affords a prolonged testing period. Shortly after the detecting point 105, the heads are separated at approximately point 106, whereby to free the shells so that they may be carried off by the carrying wheel. In Fig. 23 the leaky or imperfect cans are ejected at point 107, and the perfect cans at 108. The operation of the detector at 105 has necessarily to control the ejection at the points 107 and 108 which are some distance in the travel of the shell beyond the location of detector 105. To accomplish this delayed operation, a special mechanism is provided, which will now be described with reference to Figs. 15 to 19.

In axial relation with the auxiliary wheel or sprocket G are two concentric drums Y and Z, the one within the other. The drum Y is attached to the wheel G as shown in Fig. 15, or otherwise mounted to turn with the wheel. The revolving drum Y carries a series of ejector slides 110, each fitted with an ejector rod 111, these ejectors being equal in number to the peripheral sockets in the wheel G for receiving the shells and being equidistantly arranged in such manner that the rods are concentrically aligned with the axes of the shells when the latter are being carried around on the wheel G. It results from this arrangement that as each slide is moved to the right in Fig. 15, its rod encounters the bottom of a can lying within the shell and pushes this can from the shell, this operation being shown at about midstroke in Fig. 15. The slides 110 are guided by any suitable slideways, the construction shown being a fixed bar 112 enclosed within the slide. For giving movement to the slides the inner stationary drum Z is formed with tracks or cam grooves 114, 115 in which travel rollers 116 mounted on the inner sides of the slides. The drum Z is held stationary in any suitable manner, as by being bolted fast to the frame J'. The rollers 116 in traveling through the cam grooves are directed into one groove or the other by the operation of a switch tongue 120 (Fig. 15), which is mounted on a spindle 121 and operatively connected to a slide 122 which is movable in a stationary slideway 123 and carries at its outer end a roller 125 which is acted upon by a crown cam 126 which is mounted on the shaft $i$ to turn with the wheel G. This crown cam has equidistant depressions 127, equal in number to the peripheral recesses of the wheel G into which depressions the roller 125 may drop, whereby to reciprocate the slide 122. This slide may be connected in any convenient way to the switch spindle 121, as by the intermediation of a rock lever 130 and connecting links as shown in dotted lines in Fig. 15. A spring 135 is arranged to draw back the slide 122 to press its roller toward the cam.

The solenoid W, shown in the diagram Fig. 22, is mounted on a stationary frame 137 (Fig. 18) in fixed relation to the inner drum Z. The solenoid core is connected to a locking bolt 140 which slides in a fixed bearing 141, and its lower end is notched,—as shown in Figs. 18 and 18a,—to engage a locking plate or projection 122' fastened on the slide 122, these parts being in engagement in Fig. 18a.

If the solenoid were to hold the bolt 140 lifted, the cam 126 would, through the slide 122 and connections, throw the switch 120 back and forth each time that the roller 125 dropped into a depression of the cam,—that is to say, once for each passage of a recess in the wheel G,—and would execute this movement always between the passing of two successive rollers 116. This intermittent operation is prevented by the action of the lock 140, which normally is dropped to the position shown in Fig. 18a so as to hold the slide in the position to which it is displaced upon its roller being forced out of one of the depressions 127 in the cam. Thus the roller normally has a movement only sufficient to free the plate 122' from the notch in 140. The closing of the circuit by the detector operation (see diagram, Fig. 22) occurs at an instant when the cam 126 has thus slightly displaced the roller so that the bolt 140 is free; if at this instant the circuit is closed, the solenoid attracting its core lifts the bolt to the position shown in Fig. 18, thereby freeing the slide which, upon the roller 125 dropping into the next cam depression, is drawn by its spring 135 to the right so as to turn the switch tongue 120 to the position for guiding the rollers into the cam groove 115. This is a switch position corresponding to the detection of a leaky can by the detector. Consequently the roller 116 of the ejector slide which is to correspond in position to such leaky can, is directed into the cam groove 115 and will travel in that groove until the moment for ejection, by which time the leaky can will have reached the ejecting position and will thereupon be ejected by the cam action of the groove 115 upon the ejector slide. The ejector slide rollers corresponding to perfect cans will not be deflected by the switch 120, which will remain in its normal position, and consequently these rollers will travel in the cam groove 114 which operates the ejector at a later stage, at which time the perfect can will have reached its proper ejecting position. These operations are shown in Fig. 1b, which is a development of the cam drum Z, showing the successive positions of the rollers traveling in the cam grooves and showing the ejection of a defective can at position 107 and of a perfect can at position 108.

It will thus be understood that the distance between the detector position 105 and the ejector positions 107 and 108 is covered by the peripheral extension of the drum Z, and that the detector operation controls the switch 120, which in turn directs the traveling ejector slide rollers into one cam groove or track 114, 115 or the other, according to whether the detection shows the can to be perfect or leaky; and that is the time that the shell carrying any given can from the detector position 105 to the positions 107, 108 is occupied by the travel of the roller of the ejector corresponding to that shell in one of the prolonged and parallel portions of the cam grooves, so that if the can be defective the roller will be actuated by the inclined portion 115' of the cam groove 115 for ejection at the point 107, while if the can be perfect its ejection will occur later by the operation of the inclined portion 114' of the cam groove 114, which completes the ejection at the point 108. To accomplish this delayed ejection it is necessary that the wheel G and drum Y have, respectively, at least as many sockets and ejector slides as the number of can-holding shells which are carried between the detecting position 105 and the final ejecting position 108. In the example shown there are eight of these intervening shells, while the wheel G has nine depressions and the drum Y has nine ejectors.

For convenience of access and adjustment, the solenoid W, switch 120, and intervening connections are all mounted on a removable slide 142 which constitutes a portion of the periphery of the stationary drum Z, being movable in a slideway 143 therein so that on sliding out this slide 142 all of these operative parts may be moved bodily from the machine for adjustment, testing, or lubrication.

The can feeding mechanism for introducing the cans into the shells during their travel around the auxiliary wheel G is best shown in Figs. 1a, 20 and 21. The cans to be tested are fed, preferably by gravity, through an inclined chute 150 and are received in notches or recesses in the guide-wheel 151 (Fig. 1a), which is preferably fastened to the auxiliary wheel G,—as shown, for example, in Fig. 15. These recesses coincide with the shell-receiving recesses in the wheel G, so that as the cans are delivered into its recesses they are presented in axial alignment with the chambers within the respective shells E, E. The cans thus delivered onto the guide-wheel 151 are next acted upon by a pusher 154 which slides them into the successive shells. This pusher is best constructed as an inclined plate, as shown in Fig. 20, which exerts a wedging action against the cans to press them into the shells, as there indicated. In addition it is given a reciprocating or sweeping movement, whereby the feeding of the cans into the shells is assisted. For this purpose on the shaft g (Fig. 1) is fixed a cam 155 which acts upon a roller 156 carried by a link 157 communicating movement through a rocker 158 to a slide 159 working in fixed bearings and having at its opposite end an arm 160 which engages a loop 161 on the pusher 154, whereby to swing the latter around its pivotal connection or hinge 162. The successive feeding positions of the cans are clearly shown in Fig. 20.

It is an important advantage of my invention that the can testing units are caused to travel continuously instead of intermittently, with a complete absence of any reciprocating movements timed with the advance of the successive units. The result is that the machine is capable of operating at a speed greatly in excess of the intermittently-moving machines generally heretofore used.

The machine is readily adaptable to cans of different sizes. Thus, without changing the shells E, E, they may be adapted for any smaller size of can X' by introducing into each shell an adapter or filling shell E', as shown in Fig. 24. This adapter consists simply of an outer portion fitting within the shell E, formed with an inner concentric shell 170 having within it preferably a separate backing disk 171 which may be varied in thickness for cans of different lengths. The adapter also has a central tubular portion 172 through which the ejector stem 111 passes, as shown. The ejector drum Y with its slides 110 and stems 111 are unchanged. The chute 150 and the guide wheel 151 are necessarily altered to fit the smaller size of can to be tested. When the shell is clamped between the heads F, F', any leakage seeping around the can is conducted through the tubular portion 172 and passes out through the orifices 29 (Figs. 4 and 9) to the diaphragm, the testing operation being the same as already described. For lightness it is preferable to close the rear of the filler E' by a sheet metal plate 173.

While it is preferable to utilize the shells E, E as a portion of the links constituting the chain for carrying the shells between the wheels A and G, yet it is to be understood that the shells and the chain are essentially distinct elements, and that the shells might be constructed separately and mounted upon any ordinary form of sprocket chain, such construction being shown in Fig. 25, where 175 illustrates the usual type of chain, on the links of which the shells E, E are mounted by connecting posts 176 or any suitable fastening means.

With the chain of shells constructed as shown in the preceding figures, it is desirable in order to insure their being guided into correct seating on the saddles s, s of the brackets k of the wheel A, that the latter be provided with projecting arms 180 (Fig. 1) located in position to engage the hinge pins f by which the shells are linked together.

It is desirable also to form the shells on their outer sides with a thickened or projecting portion 181 (Figs. 7 and 11), which is the portion making contact with the guiding wheels H, I and also making guiding contact with an arc-shaped guide 182 (Fig. 1) to hold the shells closely against the auxiliary wheel G.

It will be apparent that the machine may be varied in details of construction within the scope of the present invention.

The application of a direct and positive drive to both the carrier wheel A and sprocket G is practically a very desirable feature of the described construction. While it would be possible to apply the driving power to either wheel alone and drive the other through the chain, yet this would involve some practical disadvantages and inconveniences which it is desirable to avoid. When driving from the source of power through positive gearing to both the wheels at a definite speed ratio, they are compelled to turn in perfect step and the chain of shells is caused to pass from each wheel to the other in a smooth, gentle, and frictionless manner and without any strain or pull and without jolts, so that the machine runs smoothly even at a high speed. In the particular construction illustrated (see Fig. 1), where the sprocket G has nine recesses and the carrier wheel A has thirty-six pairs of heads, the gearing establishes a rotative or angular gear ratio of 1 to 4; so that with the parts initially adjusted to allow a slight slack to the chain in passing from A to G and a greater slack in passing from G to A, the maximum smoothness of operation is insured.

It is understood that by "cans" in this specification is meant any receptacle adaptable for use in preserving food products or the like and requiring to be sealed hermetically for that purpose, such as cans, tins, jars, or other containers. The machine may be adapted for making the hermetic test before the head or top is applied, as is the condition indicated in the drawings; or when a head is applied having a filling opening through it, the empty can may be tested after such head is applied.

What I claim is:

1. A can testing machine comprising a series of testing units each comprising an open-ended imperforate shell for receiving the can within it, and opposite heads having packing gaskets for hermetically closing the ends of the shell, a carrier on which the heads are mounted, means for intoducing the successive shells into place on the carrier between the heads, and means for closing the heads together against the ends of the respective shells to form within each a hermetically closed testing chamber.

2. A can testing machine comprising a series of testing units each comprising an open-ended imperforate shell for receiving the can within it, and opposite heads having packing gaskets for hermetically closing the ends of the shell, a carrier on which the heads are mounted, means on the carrier for introducing pressure through a head into the can, an endless chain carrying the shells around the carrier, to introduce each shell into place between two heads, and means for closing the heads together against the ends of the respective shells, to form within each a hermetically closed testing chamber.

3. A machine according to claim 1, having means for carrying the shells before their journey on the carrier, and means appurtenant thereto for introducing cans to be tested into said shells.

4. A machine according to claim 1, having means for carrying the shells after their journey on the carrier, and means appurtenant thereto for ejecting the tested cans from the shells.

5. A can testing machine according to claim 1, with means for admitting pressure to such chamber within the enclosed can through one of said heads.

6. A can testing machine comprising a rotary carrier, an endless chain, a series of testing units each comprising a shell carried by the chain and pairs of opposed heads therefor mounted on the carrier, means for closing said heads together to form a testing chamber, an auxiliary wheel around which a loop of the chain is carried, and means appurtenant to said auxiliary wheel for ejecting cans from said shells.

7. A can testing machine according to claim 1, with means for admitting pressure into the enclosed can through one head, and means responding to leakage of pressure through said can, carried by the other head.

8. A can testing machine according to claim 1, with means for admitting pressure into the enclosed can and means for relieving pressure from the testing chamber exterior to the can under test, whereby to equalize pressures in such chamber of successive units.

9. A can testing machine according to claim 1, with an inlet valve for admitting pressure into the enclosed can applied to one head and a relief valve for discharging pressure from the testing chamber exterior to the can under test, applied to the other head with valve operating means for said valves located at opposite sides of the carrier.

10. A can testing machine according to claim 1, with means for admitting pressure into the enclosed can through one head, and means responding to leakage of pressure through said can applied to the other head, including a diaphragm and a plunger movable by the diaphragm.

11. A can testing machine according to claim 1, with means for admitting pressure into the can through one head, means responding to leakage of pressure through the can, including a diaphragm and a plunger movable by the diaphragm, means for opposing the movement of said plunger and means for incapacitating said opposing means to permit the free plunger movement.

12. A can testing machine according to claim 1, with means for admitting pressure into the can through one head, means responding to leakage of pressure through the can, including a diaphragm and a plunger movable by the diaphragm, a spring exerting contra-pressure against said plunger, and means for relieving the plunger of such contra-pressure.

13. A can testing machine according to claim 1, with means for introducing pressure into the cans, means carried by each unit responding to pressure due to leakage through the cans into said testing chambers, a detector located in the path of travel of such means, an ejector for tested cans located beyond the detector, and means for exerting control from the detector to the ejector, adapted to be acted on by the detector at one point in said path and to act upon the ejector at a more advanced point in said path.

14. A can testing machine according to claim 1, with means for admitting pressure into the can through one head, means responding to leakage of pressure through the can, including a movable plunger, a detector in the path of travel of such plunger, an ejector for the tested cans, located beyond the position of said detector, and means for exerting control from the detector to the ejector.

15. A can testing machine comprising a carrier and a series of testing units carried thereby through a determined path, each unit having a movable part responding to leakage through a can, a detector located in the path of travel of such movable parts, and positioning means for such detector in a determined position with respect to said units, comprising a part having gauging contact with the successive units.

16. A can testing machine according to claim 15, said positioning means including a spring-pressed support for the detector.

17. A can testing machine according to claim 15, said positioning means comprising a rotating wheel rolling in contact with the successive units.

18. A can testing machine according to claim 1, with means for admitting pressure into the can, means on each unit responding to leakage of pressure through said can, including a movable plunger, and means for opposing the movement of said plunger, combined with a detector in the path of movement of the plungers, a spring-pressed support for the detector, a positioning part carried by said support and moving in gauging contact with the successive units, and means associated therewith for incapacitating said opposing means to permit free plunger movement at the instant of detection.

19. A can testing machine comprising a series of testing units and a carrier on which they travel, said units having leakage-responsive means, a detector located in the path of travel, to be operated by the positions of such leakage-responsive means, can-ejecting means located at a later point in such path, operable to expel the cans from said units at either of two stations, according to the result of the leakage test, and means intermediate the detector and ejecting means responding to the test-indicating movements of the detector and controlling accordingly at such later point the subsequent operations of the ejecting means comprising a stationary cam-way, along which the ejecting means move, said cam-way having tracks controlling the ejectors and a switch operated by the detector for directing the controlled part of the ejector from either track to the other.

20. A can testing machine according to claim 6, the can-ejecting means comprising a rotary drum turning with said auxiliary wheel, ejector slides carried thereby and coinciding with the positions of the shells carried by the auxiliary wheel, ejector operating means comprising a stationary drum formed with two sinuous tracks having operative engagement with said slides in their travel and imparting to them their ejecting movements, a switch for directing the engagement from either track to the other, a detector responsive to leakage from the cans in said units, and means operatively connecting the detector to said switch for controlling the ejection of the cans.

21. A can testing machine according to claim 6, the ejecting means comprising ejectors having operative relation to the shells carried by said auxiliary wheel, and operating means therefor comprising a cam having a double track, ejector control means engaging said cam, a switch for directing said control means from either track to the other, mechanical means for throwing said switch, a detector responding to leakage from the cans in the successive units, and a control connection from said detector to the switch-operating means.

22. A can testing machine comprising a rotary carrier, an endless chain, a series of testing units each having a shell carried by the chain and pairs of opposed heads therefor mounted on the carrier, with means for closing said heads together to form a testing chamber, an auxiliary wheel around which a loop of the chain is carried, and means appurtenant to said auxiliary wheel for introducing cans into said shells while on said auxiliary wheel.

23. A can testing machine according to claim 22, said can-introducing means comprising a feeder for cans to be tested and a pusher for introducing the cans from said feeder into the successive shells during the continuous rotation of the auxiliary wheel.

24. A can testing machine according to claim 22, the can-introducing means comprising a feeder for cans to be tested and a reciprocating pusher for displacing the cans from said feeder into the successive shells, and means for reciprocating the pusher in step with the travel of the shells.

25. A can testing machine according to claim 22, the can-introducing means comprising a chute for delivering cans to be tested, a guide-wheel receiving said cans having recesses coincident with the successive shells carried on said auxiliary wheel and a reciprocating pusher engaging the cans carried in said recesses and thrusting them successively into the shells.

26. A can testing machine comprising a rotary carrier, an endless chain, a series of testing units each having a shell carried by the chain, and heads carried by the carrier, an auxiliary wheel around which a loop of the chain is carried, the chain being of such length as to droop between said carrier and auxiliary wheel, a source of power, and positive drive means from such source to said carrier and auxiliary wheel, respectively, whereby to maintain such droop constant.

WILLIAM DIETER.